May 7, 1940.    J. CERVERA    2,199,877
RECEPTACLE FOR TOOTH PASTE
Filed July 6, 1939
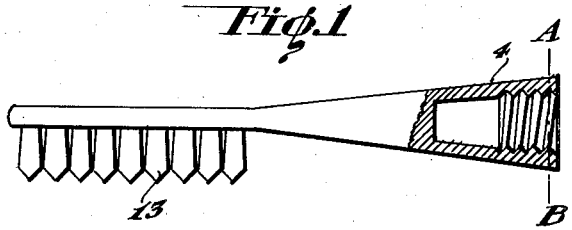
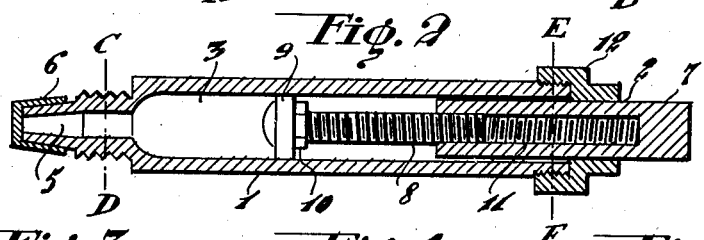
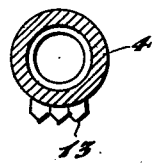
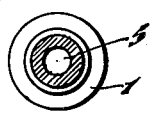
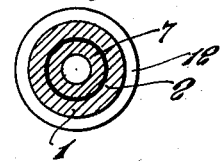
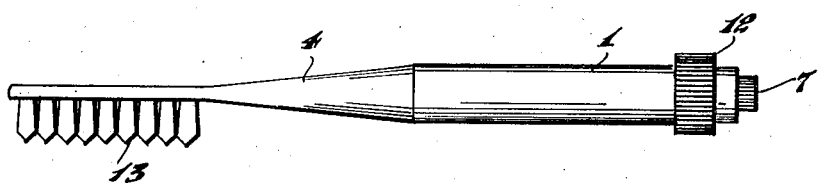
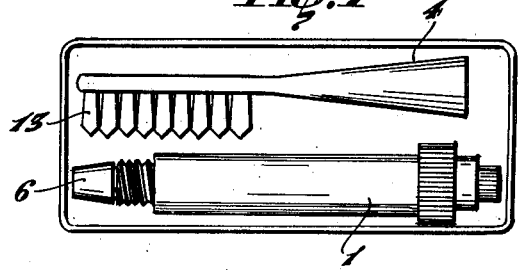
INVENTOR
JOSE CERVERA
BY
Young, Emery & Thompson
ATTYS.

Patented May 7, 1940

2,199,877

UNITED STATES PATENT OFFICE 2,199,877

RECEPTACLE FOR TOOTH PASTE

Jose Cervera, Buenos Aires, Argentina

Application July 6, 1939, Serial No. 283,119
In Argentina November 10, 1938

2 Claims. (Cl. 221—79)

The present invention refers to a new and useful receptacle for tooth paste adapted to be combined with a specially designed tooth-brush.

The outstanding advantage of said receptacle is that it may be carried in a handbag or in a pocket and so utilized for cleaning the teeth at any moment and wherever desired.

The principal feature of said receptacle lies in that it may be used in the same way as the common tooth paste tube, the paste being spread on the brush with the same ease by pressing the rear end of the ejector with the thumb. This ejector, the size of which depends upon the size of the receptacle, is composed of an endless screw which lies entirely within an internally threaded sleeve. A plunger head, the diameter of which is equal to the internal diameter of the receptacle, is secured to the forward end of the ejector and held in place by a nut. Pressure on the rear end of the ejector enables the plunger to expell the tooth paste by the outlet and in the quantity desired. As the tooth paste is used up the internally threaded sleeve is unscrewed in such wise as to increase the effective length of the ejector and so enable all the tooth paste to be expelled.

The said receptacle is also used as a handle for the tooth-brush at the moment of cleaning the teeth.

A further characteristic of said receptacle is that it may be used as a case in which a tube of tooth paste may be kept.

A further advantage lies in the fact that after being emptied of its contents the receptacle may be cleaned by washing it in hot or cold water, or alcohol, and may thus be used indefinitely.

The receptacle is constructed of Bakelite; other materials such as bone and Celluloid also being serviceable for the purpose.

The foregoing described receptacle, together with its corresponding expressly constructed tooth-brush, is conveniently enclosed in a compact case in which it may be carried.

In order that the present invention may be readily understood and carried into practice, an embodiment thereof will now be particularly described with reference to the accompanying drawing, in which:

Figure 1 is a side elevation partly in section of a brush head of bristle or rubber with small hollow handle, the end of which is internally threaded to receive the receptacle.

Figure 2 is a longitudinal section showing the ejector and method of working.

Figure 3 is a cross section of brush handle on the line A—B showing internal thread.

Figure 4 is a cross section of the receptacle on the line C—D at the thread which is screwed into the brush handle.

Figure 5 is a cross section on the line E—F of the internally threaded member which acts as a finger grip and secures the ejector.

Figure 6 is a general view of brush and receptacle mounted and ready for use.

Figure 7 represents a compact case in which brush and receptacle are carried.

The principal features of said receptacle are numbered and detailed as follows:

It is composed of a cylindrical tube 1 at one end of which is the opening 2 through which the chamber 3 is filled with tooth paste. The thread for coupling the receptacle to the brush 4 is cut on the outlet 5 which, when not in use, is covered by a cone shaped cap 6. The ejector 7 is composed of an endless screw 8 at the forward end of which a plunger head 9 is secured by a nut 10. The total length of the endless screw is covered by an internally threaded sleeve 11. The ejector is held in place by a threaded flanged member 12 which is screwed onto the inlet end of the receptacle and acts as a finger grip when the ejector is being operated.

After filling the receptacle with tooth paste the ejector is inserted at the opening 2, the threaded flange member 12 is fitted and the device is then ready to be used in the following manner. The outer end of the ejector is pressed by the thumb thus bringing the plunger head 9 into contact with the tooth paste and forcing it out through the outlet 5 and onto the tooth-brush 13 the required amount being controlled by the pressure applied. The receptacle is then screwed into the tooth-brush handle and is ready for use.

As the tooth paste is used up, the effective length of the ejector 7 is increased by unscrewing the internally threaded sleeve 11 thus gradually causing the endless screw 8 to become exposed. In this way the ejector 7 is gradually lengthened until the head of the plunger 9 reaches the outlet end of the chamber 3 thus expelling all the tooth paste, while the rear end of the ejector 7 is level with the filling opening 2. The receptacle carries sufficient tooth paste to enable it to be used from ten to twelve times, after which it is refilled.

Having now particularly ascertained and described the nature of the present invention and the manner in which the same is to be performed, what I claim is:

1. A tooth paste receptacle comprising a tooth-brush handle having means at one end for attachment to a tooth-brush, said handle having a bore extending axially thereof, said end having an outlet opening therein communicating with the bore in said handle, a plunger provided in said bore, a screw-threaded plunger rod extending from one face of the plunger, a cap on the other end of said handle having an aperture therein, and an internally threaded sleeve extending through said aperture and freely rotatable and axially displaceable therein, the plunger rod being threaded in the sleeve whereby rotation of the sleeve will cause the same to be displaced axially through the cap aperture to vary the effective length of sleeve and plunger rod.

2. A tooth paste receptacle comprising a tooth-brush handle having means at one end for attachment to a tooth-brush, said handle having a bore extending axially thereof, said end having an outlet opening therein communicating with the bore in said handle, a plunger provided in said bore, a screw-threaded plunger rod extending from one face of the plunger, a cap on the other end of said handle having an aperture therein, an internally threaded sleeve extending through said aperture and freely rotatable and axially displaceable therein, the plunger rod being threaded in the sleeve whereby rotation of the sleeve will cause the same to be displaced axially through the cap aperture to vary the effective length of sleeve and plunger rod, and a closure detachably mounted on the discharge end of the handle to close the discharge opening.

JOSE CERVERA.